US009516417B2

United States Patent
Cutler

(10) Patent No.: US 9,516,417 B2
(45) Date of Patent: Dec. 6, 2016

(54) BOUNDARY BINAURAL MICROPHONE ARRAY

(71) Applicant: Microsoft Technology Licensing, LLC, Redmond, WA (US)

(72) Inventor: Ross G. Cutler, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 319 days.

(21) Appl. No.: 13/733,137

(22) Filed: Jan. 2, 2013

(65) Prior Publication Data

US 2014/0185814 A1 Jul. 3, 2014

(51) Int. Cl.
*H04R 5/00* (2006.01)
*H04R 3/00* (2006.01)
*H04R 5/04* (2006.01)
*H04M 3/56* (2006.01)
*H04R 5/027* (2006.01)

(52) U.S. Cl.
CPC ............... *H04R 5/04* (2013.01); *H04M 3/568* (2013.01); *H04R 3/005* (2013.01); *H04R 5/027* (2013.01)

(58) Field of Classification Search
CPC .......... H04R 5/04; H04R 3/005; H04R 1/04; H04R 1/222; H04R 1/326; H04R 1/406; H04R 9/08; H04R 17/02; H04R 19/02; H04R 21/02; H04R 25/405; H04R 29/004; H04R 29/005; H04R 29/006
USPC ....... 381/26, 92, 122, 356, 91, 111, 17, 345, 381/361
See application file for complete search history.

(56) References Cited

U.S. PATENT DOCUMENTS

| | | | | | |
|---|---|---|---|---|---|
| 3,940,560 | A | * | 2/1976 | Condamines | 381/19 |
| 4,241,806 | A | * | 12/1980 | Metzger | 181/284 |
| 4,531,229 | A | * | 7/1985 | Coulter | H03G 3/3005 381/23.1 |
| 5,263,423 | A | * | 11/1993 | Anderson | A45F 5/00 108/43 |
| 5,526,430 | A | * | 6/1996 | Ono et al. | 381/26 |
| 7,068,801 | B1 | * | 6/2006 | Stinson et al. | 381/160 |
| 7,852,369 | B2 | * | 12/2010 | Cutler | H04N 5/2259 348/14.08 |
| 2005/0008173 | A1 | * | 1/2005 | Suzuki | H04R 1/345 381/160 |
| 2009/0268899 | A1 | * | 10/2009 | Tokuda | H04M 1/6033 379/420.02 |
| 2010/0019715 | A1 | | 1/2010 | Roe et al. | |

FOREIGN PATENT DOCUMENTS

RS      20 100 299 A2    4/2012
RS         20100299    *  4/2012

OTHER PUBLICATIONS

PCT International Search Report and Written Opinion of the International Searching Authority for PCT/US2013/078396 mailed on Feb. 27, 2014, 11 pages.

* cited by examiner

*Primary Examiner* — Paul S Kim
*Assistant Examiner* — Norman Yu
(74) *Attorney, Agent, or Firm* — Monica Adjemian; Tom Wong; Micky Minhas

(57) ABSTRACT

A boundary binaural microphone array includes a pair of microphones spaced from one another by a distance between approximately 5 cm and 30 cm. The boundary binaural microphone array has a structural support that locates the microphones no more than approximately 4 cm off of a surface upon which the array is placed. The microphones are separated by a sound barrier that provides an interaural level difference in the amplitudes of the sound signals sensed by the two microphones.

17 Claims, 11 Drawing Sheets

BOUNDARY BINAURAL MICROPHONE ARRAY

BACKGROUND

There are currently a wide variety of different types of communication systems. Many organizations use these types of communication systems in order to allow remote participants to attend meetings. For instance, it is quite common in many different types of organizations to have frequent meetings where more than two participants take place. It is also common, in today's business environment, for business people to travel. Therefore, many times, participants in a business meeting must attend remotely, even though they are not in the particular meeting room where the meeting is taking place.

In order to provide a reasonable user experience for a remote meeting attendee, communication systems normally attempt to address a problem referred to as "the cocktail party problem". It has been found that if a communication system provides a single microphone in the center of a cocktail party, a remote listener, who is listening to the signal generated by the single microphone, finds the cocktail party conversation generally unintelligible. However, if two microphones are spaced apart from one another in the cocktail party, and each microphone is provided to a separate speaker for the remote attendee, there is a dramatic increase in intelligibility.

It has also been found that the intelligibility increases further if the two microphones are placed in a binaural configuration. Binaural recording is a type of two-channel stereo recording. In two-channel stereo recording, two microphones are placed in strategically chosen locations relative to the sound source, with both microphones recording simultaneously. The two recorded channels are similar, but each has a distinct time-of-arrival (the time it takes for the sound wave to travel between the sound source and the microphones) and sound level information (due to the difference in the pressure exerted by the sound wave on the two microphones). During playback, the listener's brain uses these subtle differences in timing and sound level to triangulate the positions of the recorded objects.

When microphones are placed in the binaural configuration, this is done in order to further enhance the listener's experience. In Binaural recording, a pair of microphones are placed inside the ears of a dummy head (that is, a model of a human head that includes external ears and ear canals). Each microphone is placed approximately where the ear drum would reside in the dummy head.

When the recording made using microphones in this configuration is played back through headphones, each recording channel is presented independently so that each of the listener's ear drums is driven with a replica of the auditory signal that it would have experienced at the recording location.

Thus, some laboratory communication systems that allow remote participants to attend meetings have used this type of binaural recording. However, this can lead to a number of different problems. It is generally uncomfortable to the local meeting attendees to be sitting at a conference table with one or more dummy heads placed around them.

This type of arrangement also presents other problems as well. For instance, if the microphones are located in excess of approximately 4 cm above the table top, the microphones pick up sound reflections from the table. That is, if someone in the conference room is speaking, the microphone picks up the voice directly from the speaker as well as reflections of the voice off of the table top. These reflections reduce the intelligibility of the signal generated by the microphones as well.

The discussion above is merely provided for general background information and is not intended to be used as an aid in determining the scope of the claimed subject matter.

SUMMARY

A boundary binaural microphone array includes a pair of microphones spaced from one another by a distance between approximately 5 cm and 30 cm. The boundary binaural microphone array has a structural support that locates the microphones no more than approximately 4 cm off of a surface upon which the array is placed. The microphones are separated by a sound barrier that provides an interaural level difference in the amplitudes of the sound signals sensed by the two microphones.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
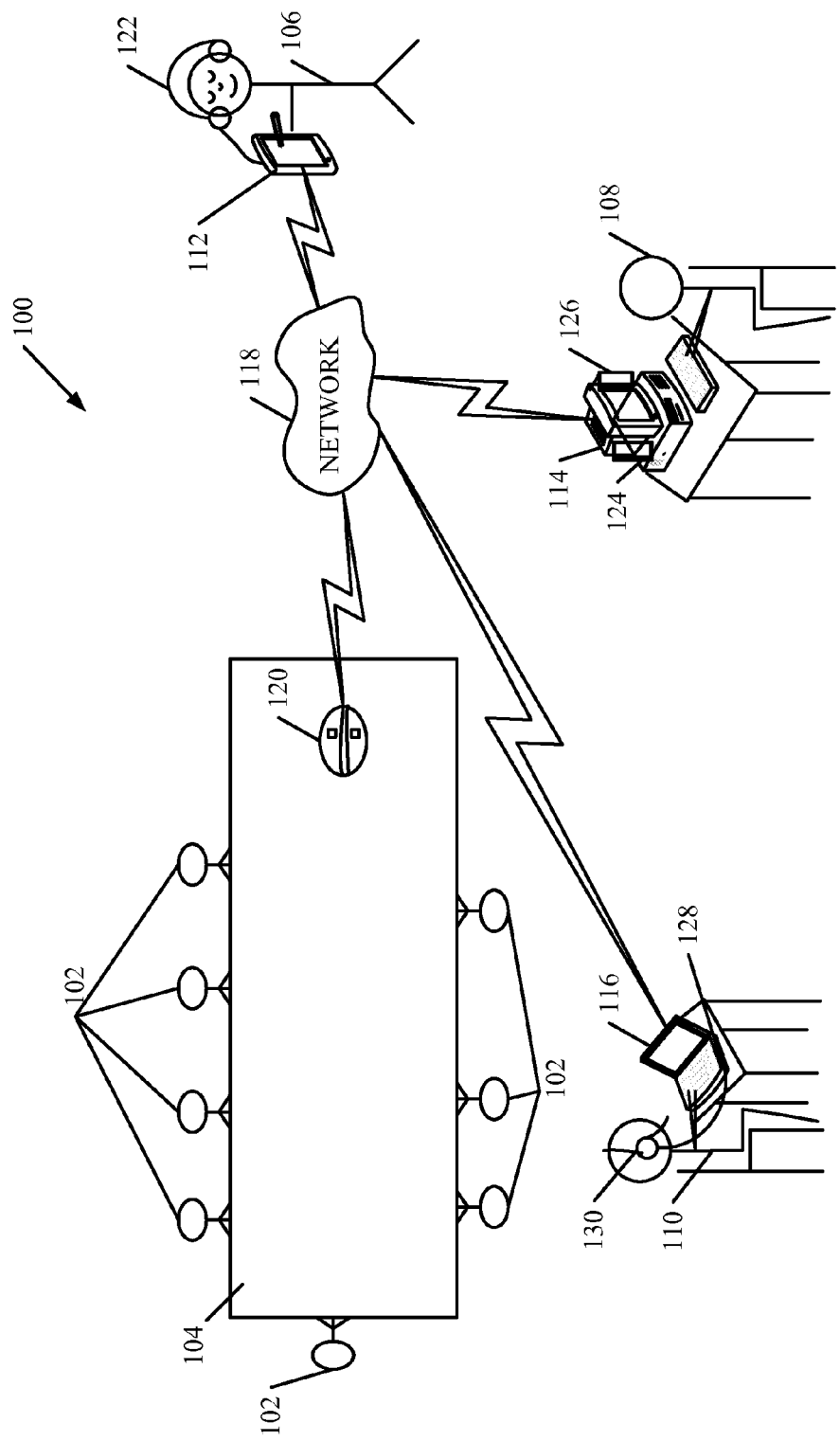
FIG. 1 shows one embodiment of a meeting architectures with a plurality of remote attendees.

FIG. 1 is a pictorial illustration of a meeting architecture 100. Meeting architecture 100 shows a plurality of local meeting participants 102 located around a conference room table 104. Architecture 100 also shows a plurality of remote participants or attendees in the meeting. The remote participants are identified by numbers 106, 108 and 110, respectively. It can be seen that each of the remote attendees 106, 108 and 110 has a computing device 112, 114 and 116, respectively. The computing devices are illustratively connected through network 118 to a microphone system 120 located locally at the meeting in meeting architecture 100.

In the embodiment shown in FIG. 1, microphone system 120 is sitting on the surface of conference room table 104. In the embodiment discussed herein, microphone system 120 has a boundary binaural microphone array disposed therein, along with microphone signal processing circuitry that provides the processed microphone signal to computing devices 112-116 over network 118. It will be appreciated that network 118 can be a local area network, a wide area network, a telephone network or a variety of other types of networks or combinations of networks as well.

Each of the remote attendees 106, 108 and 110 listen to the sounds picked up by microphone system 120 at the local meeting. Computing device 112, used by user 106, is illustratively a mobile device with a head set 122 that is coupled to mobile device 112. A variety of different mobile devices are described below with respect to FIGS. 6-9.

Computing device 114 is illustratively a desk top computer with a pair of stereo speakers 124 and 126 coupled thereto. User 108 listens to the sounds picked up by microphone system 120 through stereo speakers 124 and 126.

Computing system 116 is illustratively a laptop or tablet computer that has an audio jack 128. User 110 illustratively has a headset or a set of head phones 130 coupled to the audio jack 128 output by computing device 116.

It will be noted, as described in greater detail below, that microphone system 120 can be part of a larger system which includes a video camera, a messaging system, or other devices as well. However, for the sake of the present discussion, it will be described as a microphone system only, yet it will be realized that the microphone system could be disposed by itself, or as part of another system, or separate from, but along with, other systems.

Figure 2:
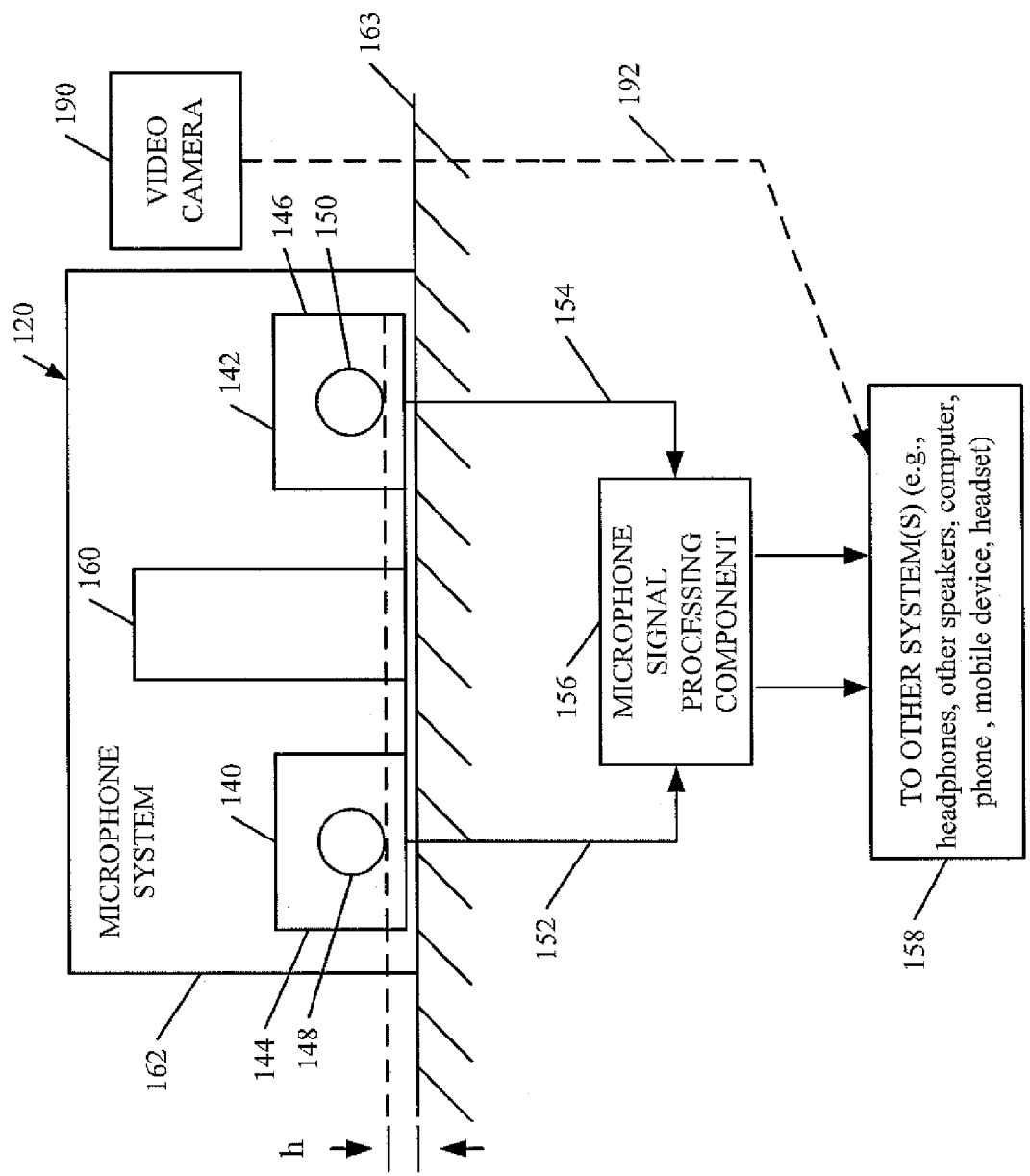
FIG. 2 shows a partial pictorial and partial block diagram of one embodiment of a microphone system.
Figure 3:
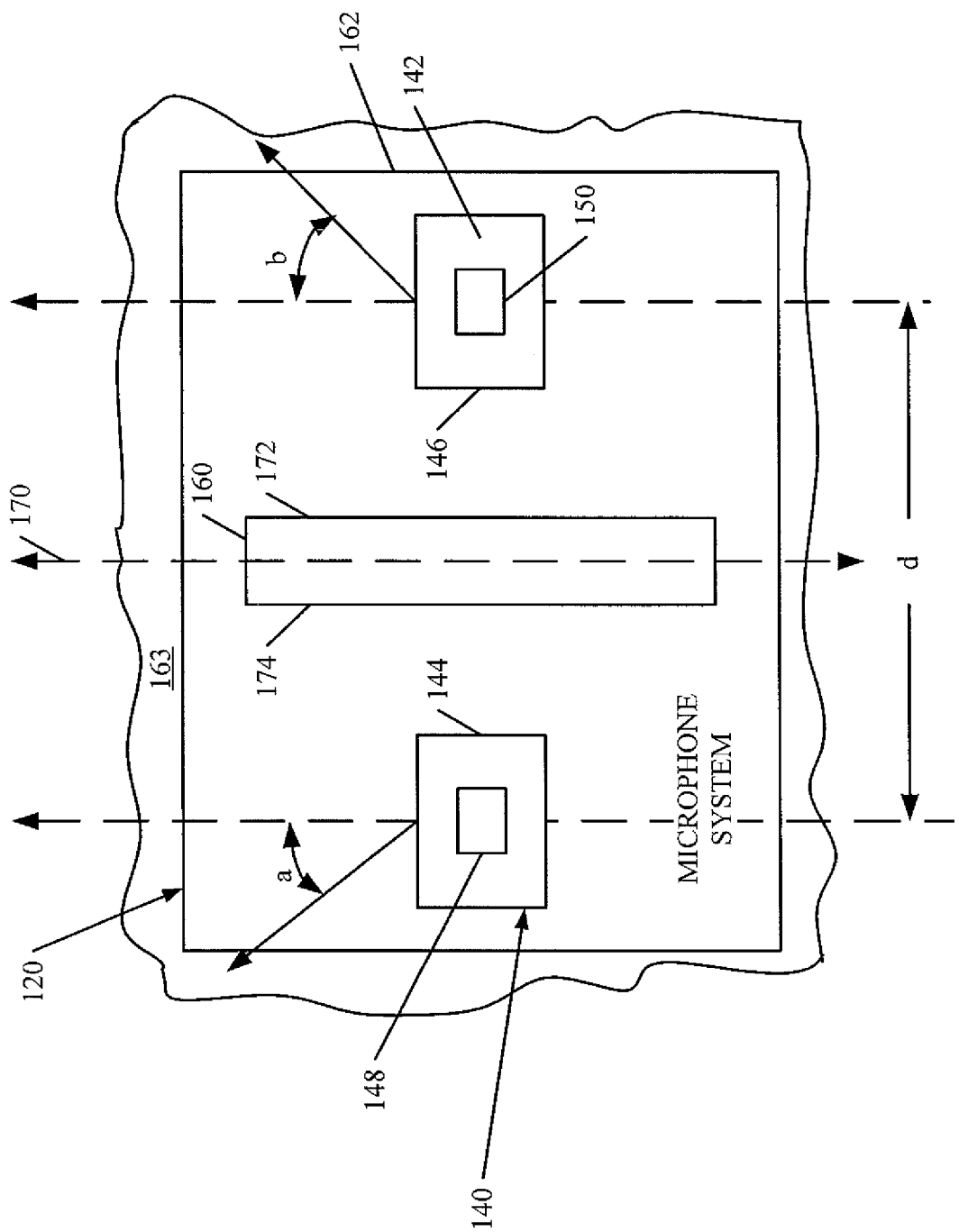
FIG. 3 shows one embodiment of a top view of the microphone system shown in FIG. 2.

FIG. 2 is a side view of one embodiment of microphone system 120, and FIG. 3 is a top view of one embodiment of microphone system 120. FIGS. 2 and 3 have similar items, and those items are similarly numbered. FIGS. 2 and 3 will now be described in conjunction with one another.

Microphone system 120 illustratively includes a pair of microphones 140 and 142, each of which illustratively includes a structural portion 144 and 146, respectively, along with a sound sensing portion 148 and 150, respectively. Structural portions 144 and 146 can be any desired structural portions that hold sensing portions 148 and 150 so that they can sense sound. Sensing portions 148 and 150 are illustratively any desired sensing portions that sense sound. In one embodiment, sensing portions 148 and 150 are movable elements that deflect in response to the pressure exerted by sound waves impinging upon them. The sensing portions 148 and 150 illustratively generate microphone signals 152 and 154, respectively, that are provided to microphone signal processing component 156.

As is described in greater detail below with respect to FIG. 5, microphone signal processing component 156 illustratively includes an amplifier and an analog-to-digital (A/D) converter. Component 156 amplifies and converts the microphone signals 152 and 154 into digital signals that are provided to other systems 158. The other systems 158 are described in greater detail below as well.

Microphone system 120 also illustratively includes a sound barrier 160 that is generally disposed between microphones 140 and 142. Microphone system 120 further illustratively includes a structural portion 162 that is used to support microphones 140 and 142, and sound barrier 160, in the configuration shown in FIGS. 2 and 3. In one embodiment, microphones 140 and 142 and sound barrier 160, are held by structural portion 162 in fixed relation to one another.

FIGS. 2 and 3 also show microphone system 120 sitting on support surface 163. In the embodiment described herein, support surface 163 is illustratively the surface of table 104 (shown in FIG. 1), although it could be any other support surface where microphone system 120 is deployed. Structural portion 162 and the structural portions 144 and 146 of microphones 140 and 142, respectively, are illustratively sized to support the sensing elements 148 and 150 of microphones 140 and 142 a height h above the support surface 163 upon which microphone system 120 is resting. In one embodiment, height h is small enough so that it significantly reduces the reflections of the sound waves off the support surface 163. Because height h is sufficiently small, the arrangement of microphones 140 and 142 is referred to as a "boundary" array—that is, the microphones are located closely proximate the boundary defined by support surface 163.

Height h is illustratively less than approximately 4 cm. In one embodiment, height h can illustratively vary from approximately 1 mm to approximately 40 mm. As used herein, the term "approximately" means +/−20%. If height h is approximately 40 mm or less, microphone system 120 will function reasonably well for narrow band speech which is speech in a range of 300 Hz-4 kHz. If height h is approximately 20 mm or less, microphone system 120 will function reasonably well for wide band speech which is speech in a range of approximately 200 Hz-8 kHz. If height h is approximately 10 mm or less, microphone system 120 will function reasonably well for super wide band speech which is speech in a range of approximately 50 Hz-16 kHz. If height h is approximately 5 mm or less, microphone system 120 will function reasonably well for ultra wide bands speech, which is speech in a range of 0 Hz-32 kHz. Of course, for systems that detect and transmit speech having a frequency between the ranges indicated above, the height h can be varied proportionally. For instance, if a system provides speech between wide band speech and super wide band speech (e.g., between 125 Hz and 12 kHz), then height h can illustratively be approximately 15 mm or less.

FIG. 3 shows that microphones 140 and 142 are separated from one another by a distance d, this illustratively provides an interaural time difference. That is, when the various speakers 102 around conference table 104 speak, microphones 140 and 142 will receive the sound wave generated by that speech at slightly different times, because microphones 140 and 142 are located a different distance from the given speaker. This is referred to as an interaural time difference. In one embodiment, microphones 140 and 142 are separated by one another by a distance that approximates the separation in an average human head between the two ear drums. In one embodiment, distance d is approximately 17 cm. However, it will be noted that distance d can be between approximately 10 cm and 20 cm, or even between approximately 5 cm and 30 cm as well.

In one embodiment, microphones 140 and 142 are omnidirectional microphones. That is, they are microphones that have a directivity index of approximately 1. In another embodiment, microphones 140 and 142 are directional microphones (e.g., uni-directional microphones) facing in a direction that is measured relative to a major access 170 of sound barrier 160. Major access 170 is illustratively parallel to a plane of sound barrier 160 defined by either side 172 or 174 of sound barrier 160. For the embodiment in which microphones 140 and 142 for directional microphones, they are illustratively offset by angles alpha and beta, respectively, relative to major access 170. Angles alpha and beta illustratively range from approximately 0 degrees offset from major access 170, to 45 degrees offset from major access 170. Of course, this range is approximate, and the microphones could be oriented in other ways as well.

In one embodiment, microphones 140 and 142 are phase synchronized microphones. That is, if they are placed close to a sound source and record a sine wave from the sound course, the microphone signals generated by microphones 140 and 142 will illustratively have the same phase to within approximately 10 degrees, across all frequencies of interest. Of course, they could be out of phase by more than 10 degrees, but the phase error makes it more difficult to obtain a desired interaural phase difference in microphone system 120.

Also, because microphones 140 and 142 are separated by noise barrier 160, there is an interaural level difference in the sound signals 152 and 154 generated by microphones 140 and 142, respectively. That is, there is a difference in the amplitude of the sound wave that impinges upon microphones 140 and 142, because they are separated by sound barrier 160. Sound barrier 160 attenuates the sound wave in a way that simulates the attenuation that happens by a human head, given the ear drums are located on opposite sides of the human head. Attenuation will illustratively vary based upon the frequency of the sound wave. High frequencies are attenuated more by sound barrier 160 than low frequencies.

Sound barrier 160 can be any of a wide variety of different types of material. Sound barrier 160, when put in a sound chamber, creates an asymmetric directivity pattern. For instance, in one embodiment, sound barrier 160, when put in a sound chamber, attenuates sound waves having a frequency of 2-3 kHz by at least approximately three decibels (3 dB). Sound barrier 160 also illustratively attenuates frequencies greater than 3 kHz by more than 3 dB. In essence, however, sound barrier 160 can be formed in any way which, when put in a sound chamber, has a directivity pattern that attenuates a signal. In one embodiment, sound barrier 160 is a hemispherically shaped element that is approximately 2 cm thick and that has a muffling layer of soft plastic foam or of wool fleece on each side. In another example, sound barrier 160 is a hemispherical shape that comprises half of a foam-covered disc. In a further embodiment, sound barrier 160 is illustratively half of a 30 cm foam-covered disc. In a specific embodiment, sound barrier 160 is half of a Jecklin disc. Of course, foam barrier 160 need not be hemispherically shaped, but could instead be oval, square or rectangular in shape as well. Similarly, it could be shaped as another type of polygon or in another desired geometric shape.

As one additional note with respect to FIG. 2, video camera (or webcam) 190 is also shown. In one embodiment, video camera 190 is used along with microphone system 120 to generate a video signal 192 provided to other systems 158, so that it can be viewed by the remote attendees as well. This is optional only, and therefore it is shown in phantom in FIG. 2.

Figure 4:
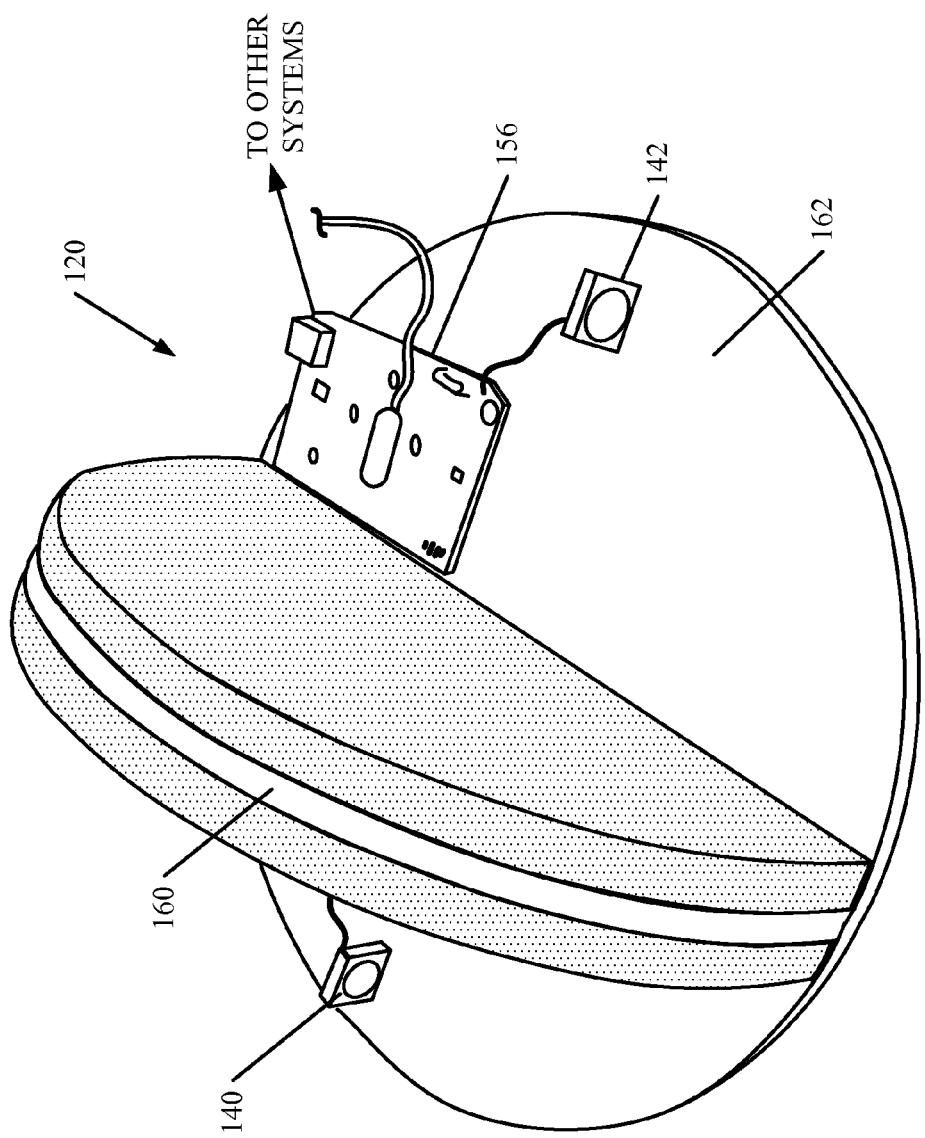
FIG. 4 shows one embodiment of a perspective view of the microphone system shown in FIGS. 2 and 3.

FIG. 4 shows one embodiment of a pictorial illustration of microphone system 120. It can be seen in FIG. 4 that support structure 162 is a generally circular or oval-shaped support structure that can be made of wood, plastic, metal, or any other desired structural material. FIG. 4 also more clearly shows the embodiment in which sound barrier 160 is a hemispherical portion of a sound barrier disc. Of course, this is one example only, and other shapes or sizes of sound barrier 160 can be used as well.

Figure 5:
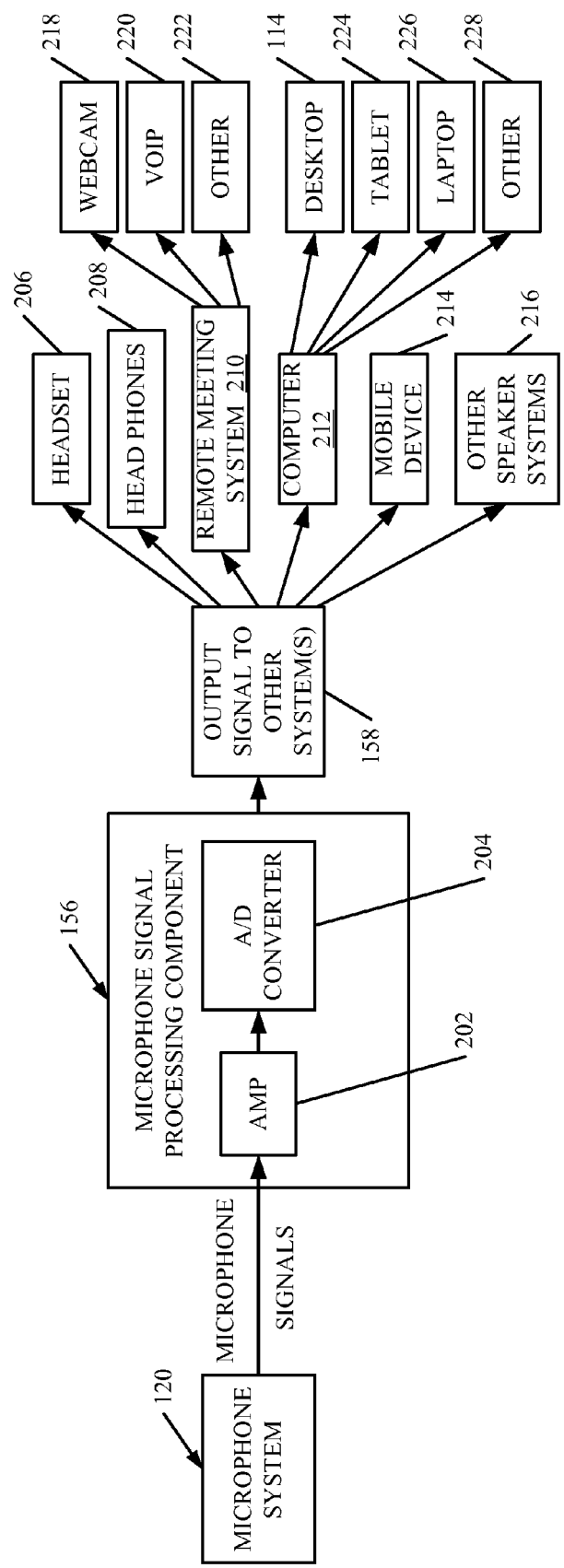
FIG. 5 shows one embodiment of a block diagram of a plurality of sound systems that can be used with the microphone system.

FIG. 5 is a block diagram showing microphone signal processing component 156 and other systems 158 in more detail. It can be seen in FIG. 5 that microphone signal processing component 156 illustratively includes one or more amplifiers 202 and one or more analog-to-digital (A/D) converters 204. Amplifiers 202 illustratively amplify the microphone signals to a desired level. The amplified signals are then provided to A/D converter 204 where they are converted to digital signals that are output to other systems 158. It can be seen in FIG. 5 that other systems 158 can include a head set 206, head phones 208, remote meeting systems 210, a computer 212, a mobile device 214 or other speakers 216. Remote meeting system 210 can include a web camera-based system 218, voice over IP (VOIP) system 220 or other remote meeting systems 222. In one embodiment, for instance, remote meeting system 210 is a service that allows users to communicate with peers by voice using a microphone, video by using a web cam, and instant messaging over the internet. Phone calls can be placed to recipients over traditional telephone networks and can include file transfer capabilities and video conferencing capabilities.

FIG. 5 also shows that computer 212 can include a desktop computer (such as computer 114 shown in FIG. 1, tablet computer 224, laptop computer 226, or another computing device 228. More examples of computing devices are discussed below with respect to FIGS. 6-10.

Figure 6:
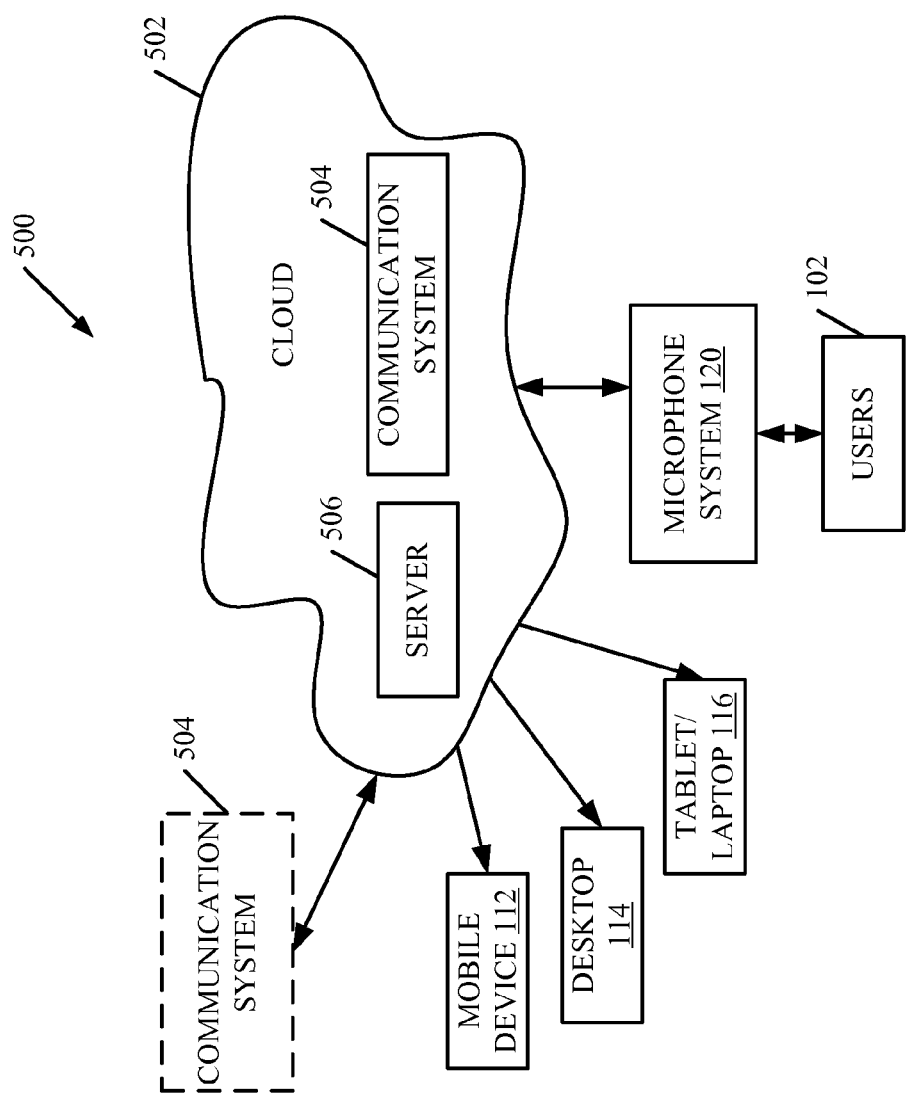
FIG. 6 shows a cloud computing architecture.

FIG. 6 is a block diagram of architecture 100, shown in FIG. 1, except that the communication system 504 is disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of communication system 504 as well as the corresponding data, can be stored on servers 506 on a cloud or at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the embodiment shown in FIG. 6, some items are similar to those shown in FIG. 1 and they are similarly numbered. FIG. 6 specifically shows that communication system 504 is located in cloud 502 (which can be public, private, or a combination where portions are public while others are private). Therefore, users 102 speak and the speech is picked up by microphone system 120 and the microphone signals are provided to communication system 504 through cloud 502.

FIG. 6 also depicts another embodiment of a cloud architecture. FIG. 6 shows that it is also contemplated that some or all elements of communication system 504 are disposed in cloud 502 while others are not. By way of example, the data store or other parts of system 504 can be disposed outside of cloud 502, and accessed through cloud 502. Regardless of where they are located, the items in communication system 504 can be accessed directly by microphone system 120, through a network (either a wide area network or a local area network), they can be hosted at a remote site by a service, or they can be provided as a service through a cloud or accessed by a connection service that resides in the cloud. All of these architectures are contemplated herein.

It will also be noted that system 504, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 7:
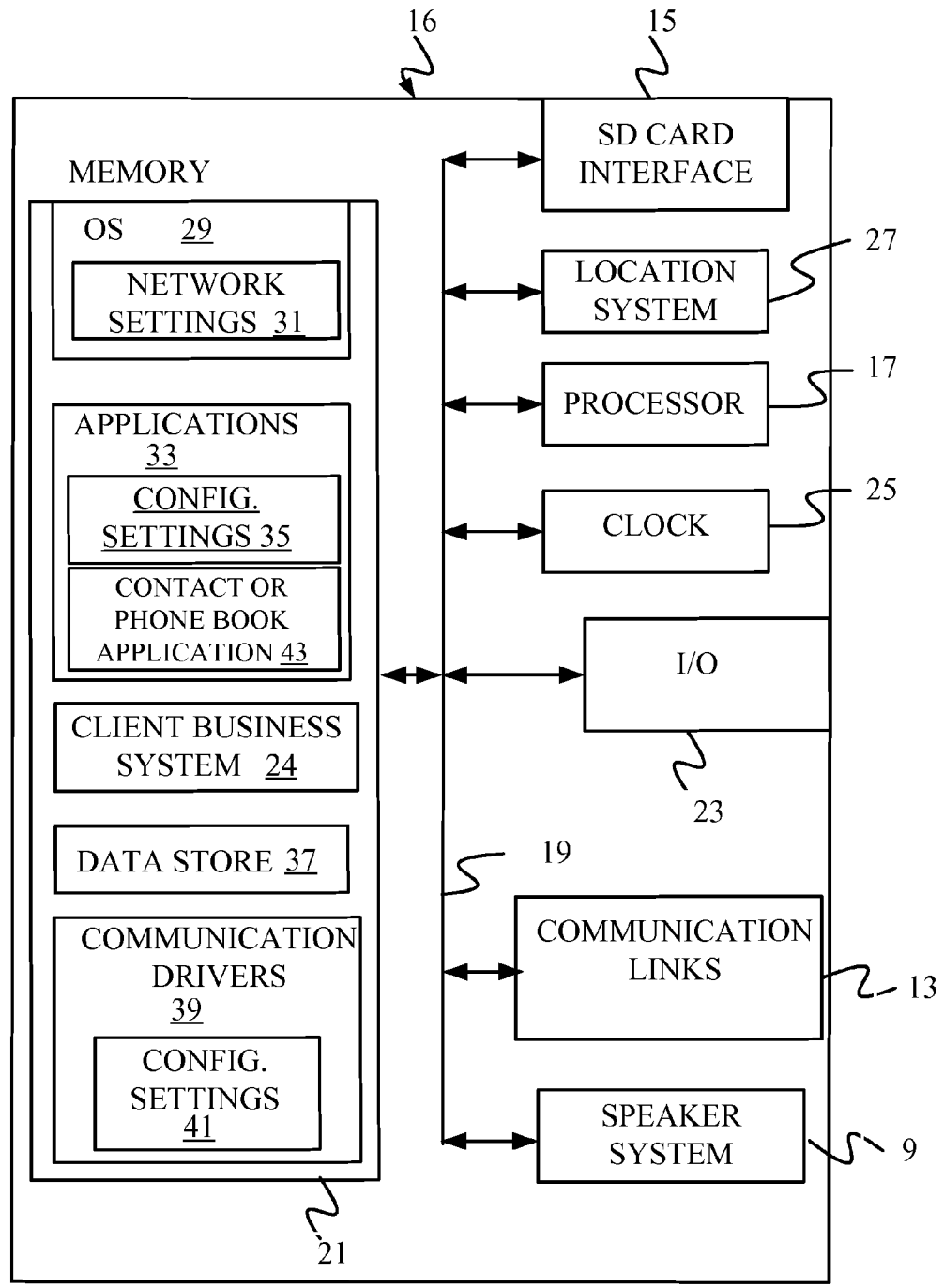
FIGS. 7-10 show various embodiments of mobile devices.

FIG. 7 is a simplified block diagram of one illustrative embodiment of a handheld or mobile computing device (like device 112 in FIG. 1) that can be used as a user's or client's hand held device 16, which can receive the signals from microphone system 120 or which can implement all or part of communication system 504. FIGS. 6-9 are examples of handheld or mobile devices.

FIG. 7 provides a general block diagram of the components of a client device 16 that can run components of system 504 or that receives the signals from system 504, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1×rtt, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems (like system 504) are received on a removable Secure Digital (SD) card that is connected to a SD card interface 15. SD card interface 15 and communication links 13 communicate with a processor 17 along a bus 19 that is also connected to speaker system 9, memory 21 and input/output (I/O) components 23, as well as clock 25 and location system 27.

Speaker system 9, in one embodiment, is a stereo speaker system. In another embodiment, it is a headphone or headset jack that can have a headset or headphones plugged into it. Thus, a user can remotely attend the meeting shown in FIG. 1.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. System 504 for example, can reside in memory 21. Similarly, device 16 can have a client system 24 which can run various applications or embody parts or all of system 504. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

Figure 8:
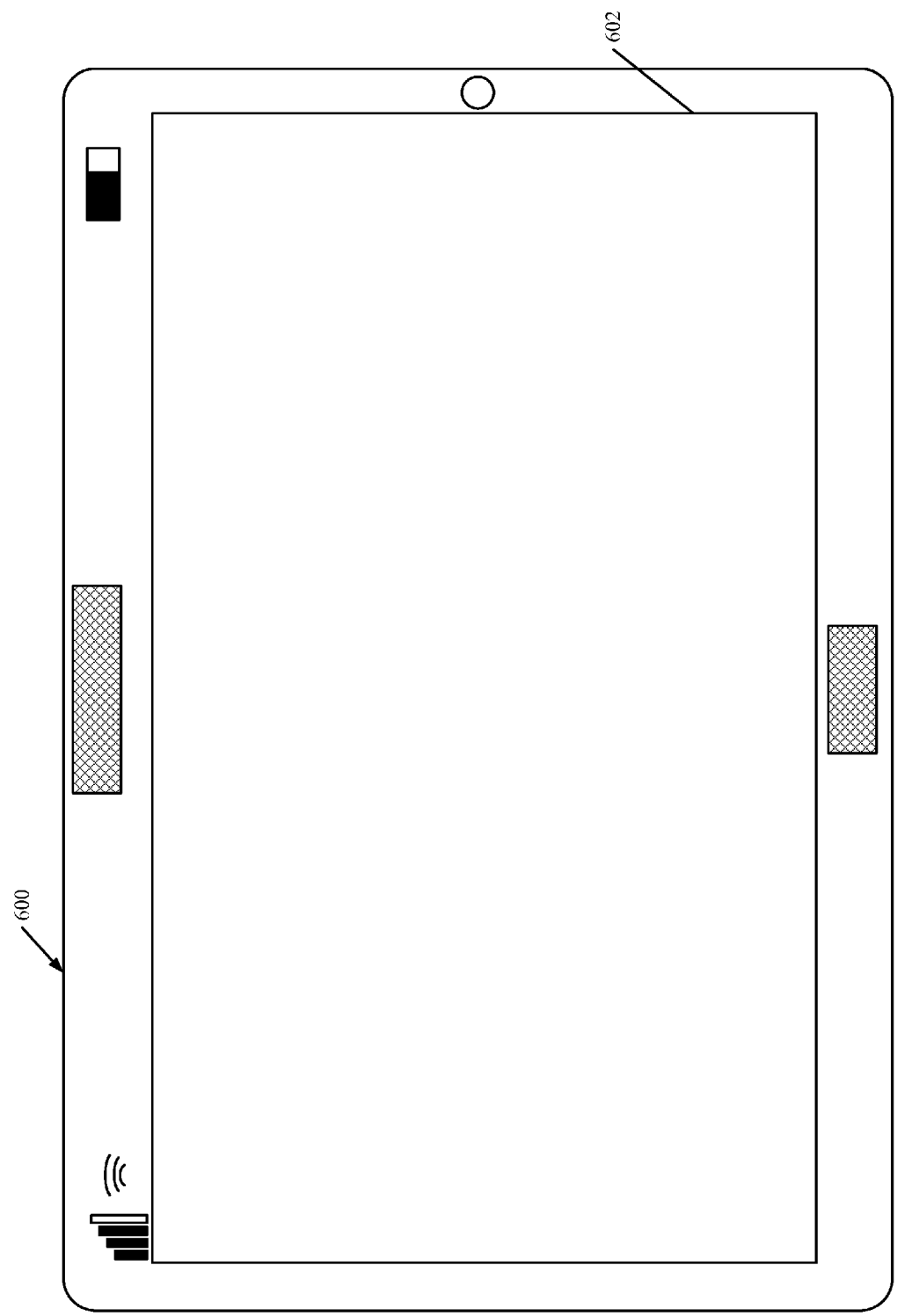

FIG. 8 shows one embodiment in which device 16 (e.g., device 112 or device 116 from FIG. 1) is a tablet computer 600. Screen 602 can be a touch screen (so touch gestures from a user's finger 604 can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Figure 9:
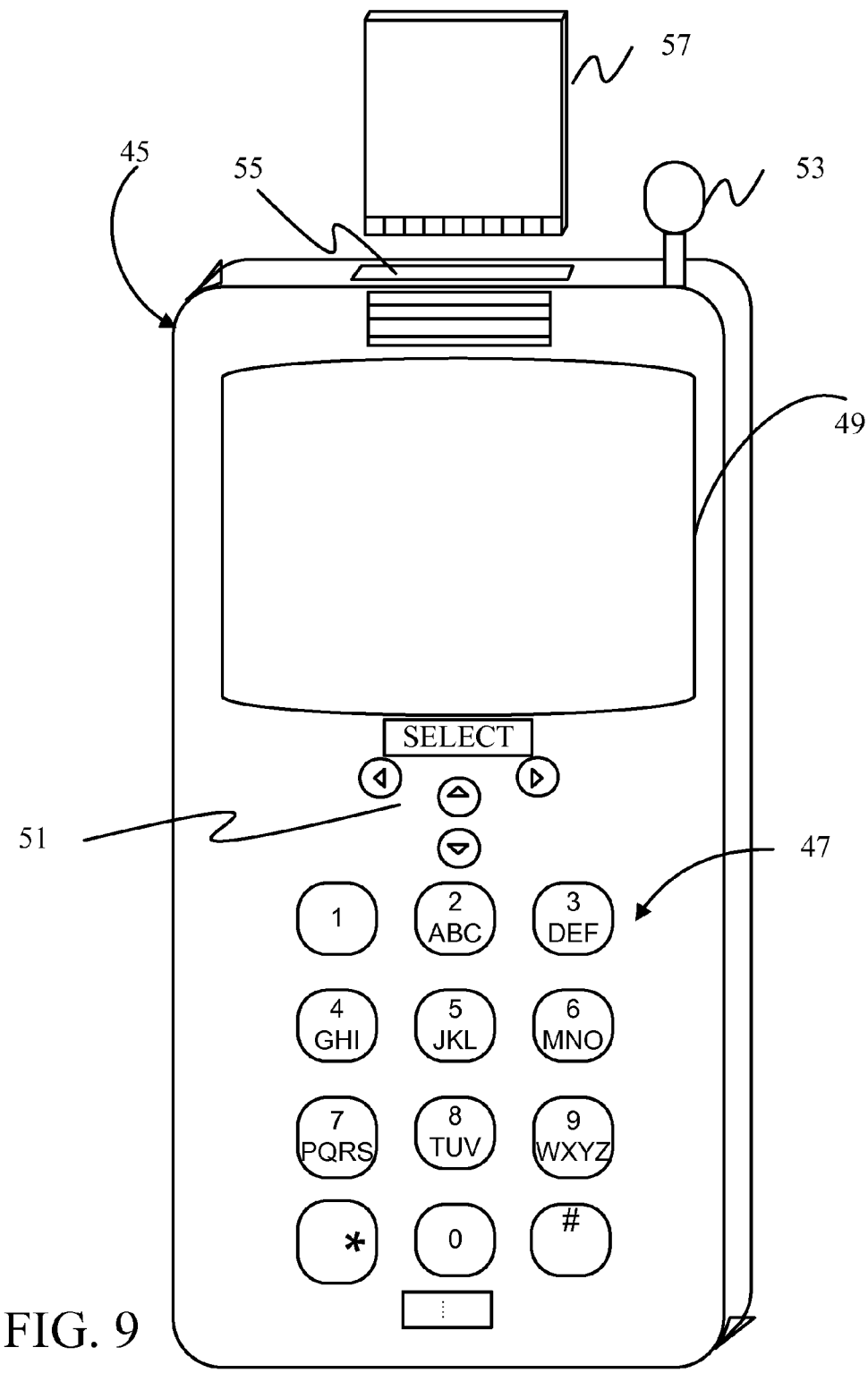
Figure 10:
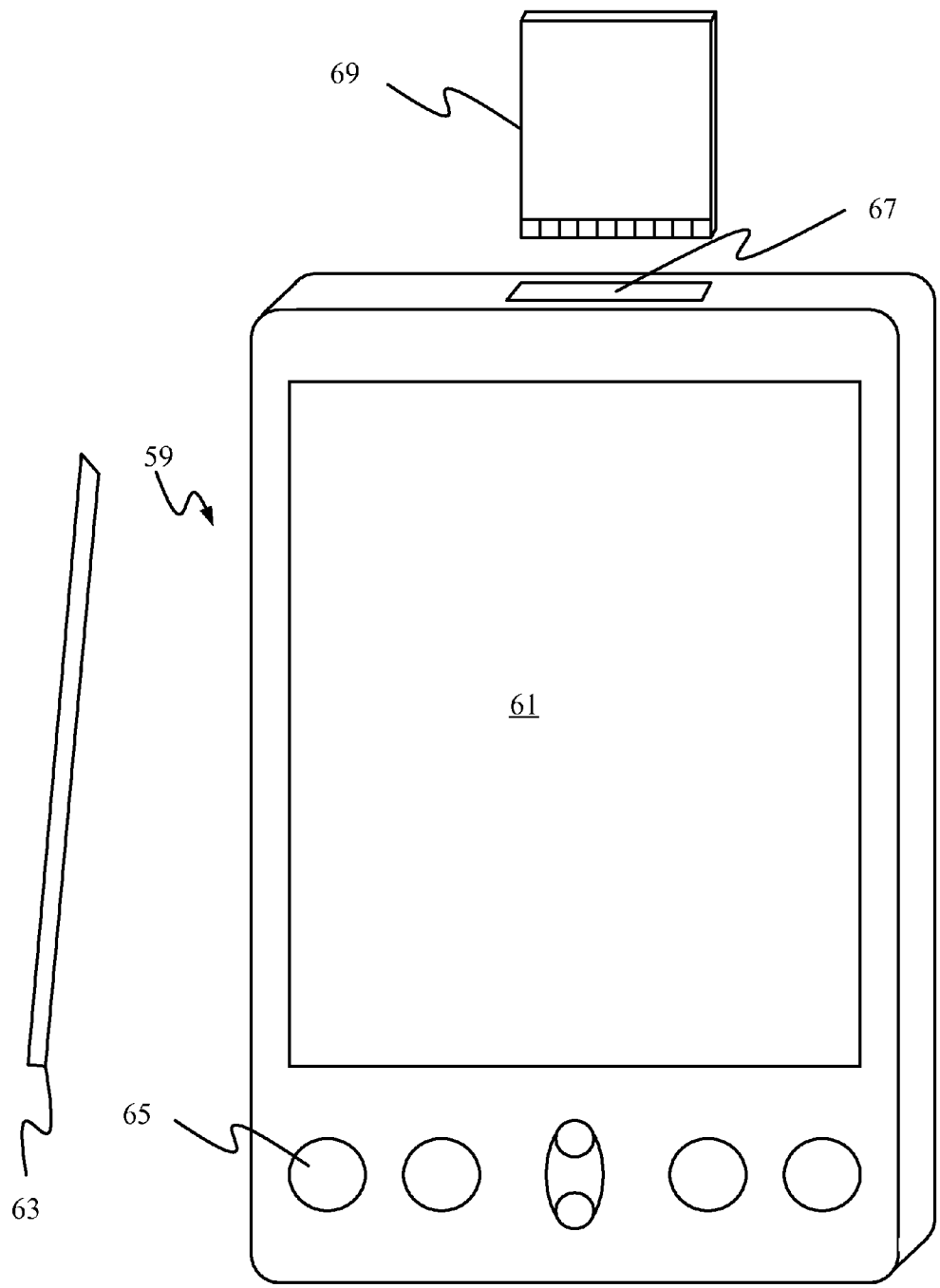

FIGS. 9 and 10 provide additional examples of devices 16 that can be used, although others can be used as well. In FIG. 9, a smart phone or mobile phone 45 is provided as the device 16. Phone 45 includes a set of keypads 47 for dialing phone numbers, a display 49 capable of displaying images including application images, icons, web pages, photographs, and video, and control buttons 51 for selecting items shown on the display. The phone includes an antenna 53 for receiving cellular phone signals such as General Packet Radio Service (GPRS) and 1×rtt, and Short Message Service (SMS) signals. In some embodiments, phone 45 also includes a Secure Digital (SD) card slot 55 that accepts a SD card 57.

The mobile device of FIG. 10 is a personal digital assistant (PDA) 59 or a multimedia player or a tablet computing device, etc. (hereinafter referred to as PDA 59). PDA 59 includes an inductive screen 61 that senses the position of a stylus 63 (or other pointers, such as a user's finger) when the stylus is positioned over the screen. This allows the user to select, highlight, and move items on the screen as well as draw and write. PDA 59 also includes a number of user input keys or buttons (such as button 65) which allow the user to scroll through menu options or other display options which are displayed on display 61, and allow the user to change applications or select user input functions, without contacting display 61. Although not shown, PDA 59 can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections. In one embodiment, mobile device 59 also includes a SD card slot 67 that accepts a SD card 69.

Note that other forms of the devices 16 are possible.

Figure 11:
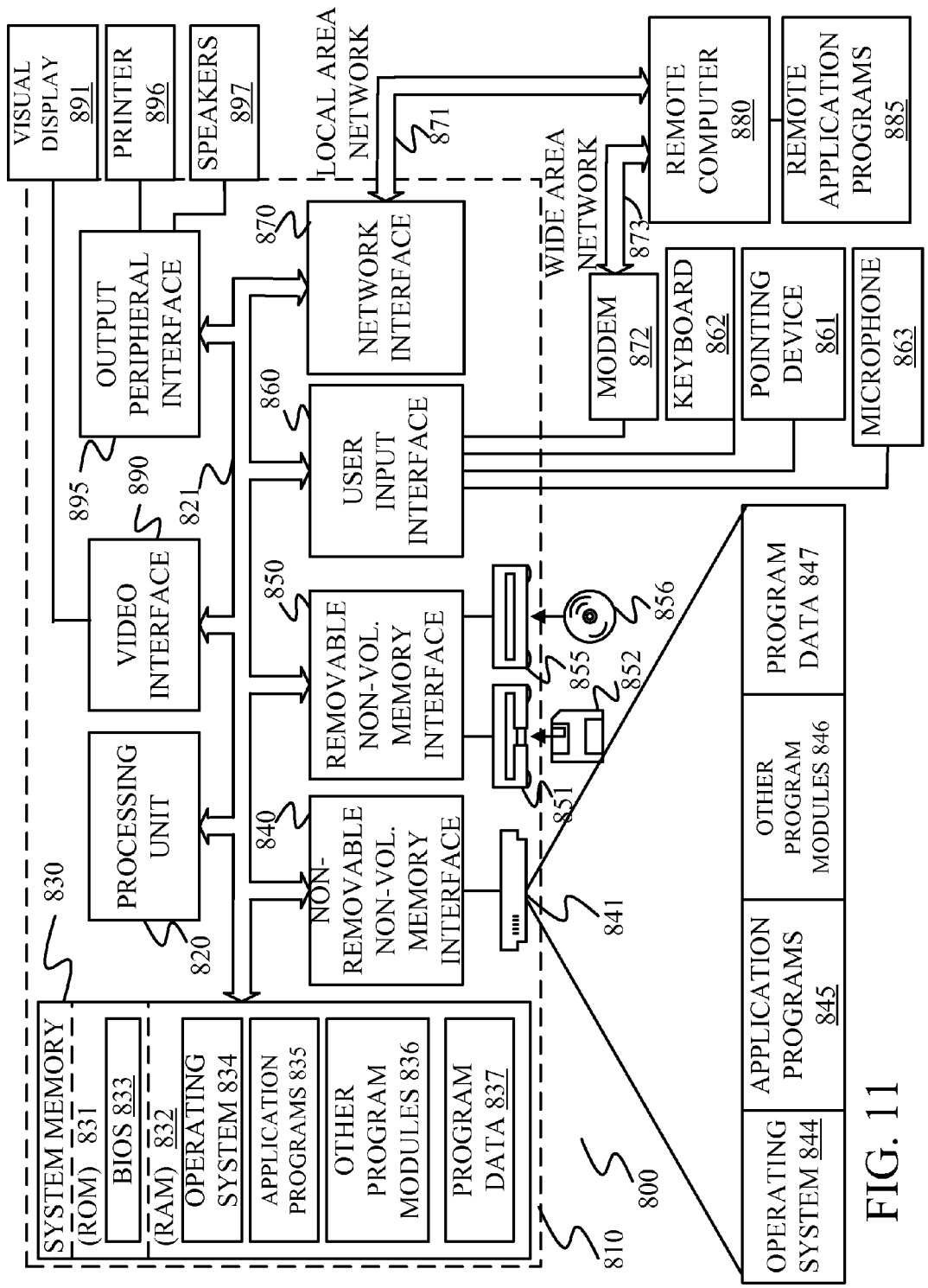
FIG. 11 shows one embodiment of a computing environment.

FIG. 11 is one embodiment of a computing environment in which system 504 (for example) can be deployed or which can be used as device 114 (from FIG. 1) or server 506 (from FIG. 6) or as other devices described herein. With reference to FIG. 11, an exemplary system for implementing some embodiments includes a general-purpose computing device in the form of a computer 810. Components of computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to the previous FIGS. can be deployed in corresponding portions of FIG. 11.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 11 illustrates operating system 834, application programs 835, other program modules 836, and program data 837.

The computer 810 may also include other removable/non-removable volatile/nonvolatile computer storage media. By way of example only, FIG. 11 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 11, provide storage of computer readable instructions, data structures, program modules and other data for the computer 810. In FIG. 11, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 11 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 11 illustrates remote application programs 885 as residing on remote computer 880. It will be appreciated that the network connections shown are exemplary and other means of establishing a communications link between the computers may be used.

It will be noted that the embodiments discussed herein can be combined as well. For instance, features of one embodiment can be combined with features of other embodiments.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A microphone system, comprising:
   a boundary binaural microphone array comprising:
   a first directional microphone;
   a second directional microphone spaced from the first directional microphone by a distance in a range of approximately 10 cm to 30 cm;
   a sound barrier, having a major axis, positioned between the first and second directional microphones to attenuate a sound signal moving between the first and second directional microphone, the first and second directional microphones being pointed in a direction offset from the major axis of the sound barrier by an angle in a range of approximately 0 degrees to 45 degrees;
   a structural support having a first surface that contacts a support surface on which the first and second directional microphones are placed and spaces the first and second directional microphones from the support surface by a height in a range of approximately 0 cm to 40 mm, wherein, when the first surface contacts the support surface, the sound barrier is positioned at least partially above the support surface; and
   a microphone signal processing component coupled to the boundary binaural microphone array to process microphone signals received from the boundary binaural microphone array for output to a speaker system.

2. The microphone system of claim 1 wherein the first and second directional microphones are pointed in a direction approximately parallel to the major axis of the sound barrier, and wherein the first and second directional microphones are spaced from one another by a distance of approximately 17 cm.

3. The microphone system of claim 1, wherein the first surface of the structural support spaces the first and second directional microphones from the support surface by a height in a range of approximately 0 mm to 30 mm.

4. The microphone system of claim 1, wherein the first surface of the structural support spaces the first and second directional microphones from the support surface by a height in a range of approximately 0 mm to 20 mm.

5. The microphone system of claim 1, wherein the first surface of the structural support spaces the first and second directional microphones from the support surface by a height in a range of approximately 0 mm to 10 mm.

6. The microphone system of claim 1, wherein the first surface of the structural support spaces the first and second directional microphones from the support surface by a height in a range of approximately 0 mm to 5 mm.

7. The microphone system of claim 1, wherein the first and second directional microphones are pointed in a direction approximately parallel to the major axis of the sound barrier.

8. The microphone system of claim 1, wherein the first and second directional microphones are spaced from one another by a distance of approximately 17 cm.

9. The microphone system of claim 1, wherein the sound barrier is formed to generate a directivity pattern that attenuates a sound signal when placed in a sound chamber and subjected to a sound.

10. The microphone system of claim 1, wherein the sound barrier is configured to attenuate a first sound frequency more than a second sound frequency, the first sound frequency being higher than the second sound frequency.

11. The microphone system of claim 1, wherein the sound barrier attenuates sound frequencies between 2 kHz and 3 kHz by at least approximately 3 decibels.

12. The microphone system of claim 1, wherein the sound barrier attenuates sound frequencies of 3 kHz or more by at least 3 decibels.

13. The microphone system of claim 1, wherein each directional microphone has a sensitivity to sound received from a first direction that is substantially different than a sensitivity to sound received from a second direction.

14. The microphone system of claim 1, wherein the sound barrier comprises a hemispherically shaped element.

15. The microphone system of claim 1, wherein the sound barrier is approximately 2 cm thick.

16. The microphone system of claim 1, wherein the sound barrier comprises a muffling layer of material.

17. The microphone system of claim 1, and further comprising a structural support portion configured to support the first directional microphone, the second directional microphone, and the sound barrier in fixed relation to one another.

* * * * *